Figure 1:
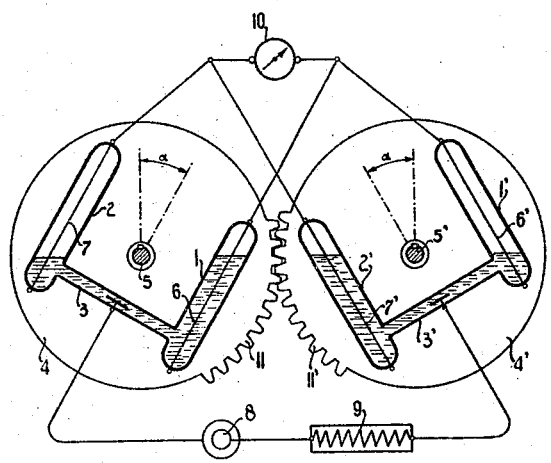

July 20, 1926.

C. SCHOUTE 1,593,363

APPARATUS FOR DETERMINING THE ANGULAR POSITION OF AN OBJECT

Filed March 28, 1923

INVENTOR
CORNELIS SCHOUTE
BY
Lotka, Kehlenbeck & Mathe
ATTORNEYS

Patented July 20, 1926.

1,593,363

UNITED STATES PATENT OFFICE.

CORNELIS SCHOUTE, OF DE BILT, NETHERLANDS.

APPARATUS FOR DETERMINING THE ANGULAR POSITION OF AN OBJECT.

Application filed March 28, 1923, Serial No. 628,261, and in Germany October 16, 1922.

My present invention relates to apparatus for determining variable angles, comprising a pair of intercommunicating vessels such as tubes movable as a whole about an axis and partially filled with an electrically conducting fluid, a conducting body arranged in one or in both of said vessels lengthwise therein, and means for determining the electric resistance of the conducting body at varying angles of the apparatus, reference being had to my British Patent No. 161,555. Apparatus of this character serve to indicate through electric means on distant instruments the variation of the free length and, consequently, of the electric resistance of the said conducting body upon a swinging motion of the said vessels owing to a displacement or to an angular movement of the object with which the said vessels are operatively coupled.

The displacements or angular movements of the object under consideration must, of course, be indicated relative to another object which, in order that the apparatus may operate satisfactorily, should have no movement with respect to the earth, in view of the fact that the operation of the apparatus depends upon the horizontality of the surface of the conducting fluid in the intercommunicating vessels. For instance, in order that the apparatus may be used for indicating on distant instruments the angular position of a rudder, it is necessary for the apparatus to be supported in a gimbal and for the movements of the rudder to be transmitted thereto through flexible means, such as a Bowden wire.

My present invention has for its principal object an improved arrangement whereby the gimbal may be dispensed with, so that it is no longer necessary for the apparatus to remain in an invariable position relative to the earth. Owing to this novel arrangement the apparatus may be rigidly secured to a ship and nevertheless accurately indicate the angular position of the rudder notwithstanding the motions of the ship in a seaway.

With said object in view the set of intercommunicating vessels or tubes is duplicated and both sets are so associated that opposed movements are imparted thereto whenever the object under consideration is displaced or performs an angular movement. Calculation has shown that when the swinging axes of said sets are disposed athwartships so that the rolling of the vessel does practically not interfere with the indications of the apparatus, a pitching movement of the vessel through angular distances of 6° up and down does not cause a difference in the indication of the rudder position of fully 1° from the correct value when both sets of tubes swing through equal angles in opposed directions. In practice this slight difference may be neglected.

My novel apparatus is of value not only for vessels, but also for aerial navigation. Generally speaking it may be used whenever it is desired to read variable positions of a part relative to a moving object.

Figure 2:
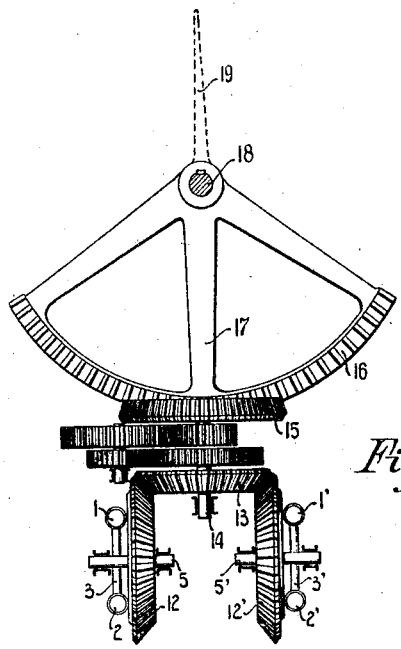

Referring to the drawing, Figure 1 shows the diagram, and Figure 2 the construction of an embodiment of the invention.

Referring to Figures 1 and 2, the tubes 1, 2 of the one set and the tubes 1', 2' of the other set are interconnected through tubes 3 and 3', respectively, of relatively small cross-sectional area. The said sets of tubes are mounted on circular discs 4 and 4', respectively, rotatable about shafts 5 and 5' respectively. Longitudinally disposed in the tubes 1, 2, 1' and 2' are conducting bodies or filaments 6, 7, 6' and 7' respectively. Said conducting bodies or filaments form parts of two circuits as shown, which circuits comprise a common source of electricity 8 and a common resistance 9, and are connected to a common galvanometer 10 so as to form what may be called a Wheatstone bridge. The discs 4 and 4' intermesh by circular gear rims 11 and 11' respectively in such a manner that rotation of the one disc in a given direction causes the other disc to turn through the same angular distance in the opposite direction.

As shown in Figure 2 the sets of tubes 1, 2, 3 and 1', 2', 3' are mounted on mitre wheels 12 and 12' respectively, having equal diameters and being keyed on shafts 5 and 5', respectively. The mitre wheels 12, 12' intermesh with a common mitre wheel 13 keyed on a shaft 14 and driven through suitable gearing by a mitre wheel 15 in mesh with a toothed quadrant 16. The quadrant 16 is secured through arms 17 to the post 18 of a rudder 19.

It is obvious that angular displacements of the rudder 19 cause the two sets of tubes to swing in opposite directions through equal angles, and that the positions of the rudder may be indicated at a distance through the above described electric means with quite sufficient accuracy.

It will be understood that when the rudder is in its neutral position the tubes will extend vertically, and the electrical resistance in each branch of the Wheatstone bridge will preferably be equal, so that there will be no deflection of the galvanometer. When the rudder is moved to either side of neutral each set of tubes will be proportionately inclined in opposite directions so that a proportionate variation of the liquid levels in all the tubes occurs, thereby producing variations, proportional to the movement of the rudder, in the electrical resistances of the conductors which form each of the arms or branches of the Wheatstone bridge circuit. As a result of these variations in the electrical resistances there will occur, in accordance with the well known properties of the Wheatstone bridge circuit, a deflection of the galvanometer which is accurately indicative of the direction and extent of the rudder movement. With an arrangement such as shown in Fig. 2, a rolling of the vessel would be equivalent to inclining the tubes shown in Fig. 1 at right angles to the plane of the paper. This obviously would cause only an inclination of the top surface of the liquid in each tube, which inclination would be the same in each tube and therefore would not produce any differences in the electrical resistances of the branches.

A pitching of the vessel would produce an equal movement of the liquid longitudinally of the tubes, but in the same direction in each set of tubes. For example, if the pitching occurs, referring to Fig. 1, in a direction equivalent to a rotation of the paper in a clockwise direction, the liquid level will fall an equal amount in tubes 2 and 2' and will rise an equal amount in tubes 1 and 1'. Taking the simplest case, that is with the rudder in neutral position, and assuming that $r$ indicates the resistance of the wire for each branch of the circuit, $n$ the distance the liquid level has varied in each tube, and that the branches $r^1$, $r^2$, $r^3$ and $r^4$ of the Wheatstone bridge correspond respectively to the conductors leading through the tubes 2, 2', 1 and 1', it will be seen that the resulting resistances in each branch of the bridge will be $r^1=r+n$, $r^2=r-n$, $r^3=r+n$ and $r^4=r-n$, hence $$\frac{r^1}{r^2}=\frac{r^3}{r^4},$$

the condition for no current through the galvanometer, is fulfilled by the equation $$\frac{r+n}{r-n}=\frac{r+n}{r-n}.$$

When the rudder is at an angle $a$, with current passing through the galvanometer, and a pitching of the vessel occurs, the inclination of the vessel causes a variation in the liquid levels of the tubes of one set equivalent to increasing, and in the other set to decreasing the angle $a$, because of the fact that each set of tubes has been moved, in accordance with my invention, in opposite directions. Therefore the departure in the galvanometer indications from true rudder positions, caused by the pitching of the vessel when the rudder is inclined is, as can be readily proved by use of the mathematical formulæ for the Wheatstone bridge, practically negligible, (not greater than 1%) even for tilting angles as high as 6°.

What I claim is:—

In apparatus for determining variable angles, two sets of intercommunicating vessels partially filled with an electrically conducting fluid, a resistance body arranged in a vessel of each set in position to be affected by the level of the fluid, axes on each of which one of said sets is movable as a whole, connecting means between said sets to cause a swinging motion of the one set in one direction to impart swinging motion in the opposite direction to the other set, and indicating means responsive to variations in the electric resistance of said resistance bodies.

In testimony whereof I affix my signature.

Dr. CORNELIS SCHOUTE.